(12) United States Patent
Kompella et al.

(10) Patent No.: US 8,074,113 B2
(45) Date of Patent: Dec. 6, 2011

(54) SYSTEM AND METHOD FOR DATA PROTECTION AGAINST POWER FAILURE DURING SECTOR REMAPPING

(75) Inventors: Murthy Kompella, Costa Mesa, CA (US); Joseph H. Steinmetz, Costa Mesa, CA (US); Narayan Ayalasomayajula, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 233 days.

(21) Appl. No.: 12/401,529

(22) Filed: Mar. 10, 2009

(65) Prior Publication Data

US 2010/0235678 A1 Sep. 16, 2010

(51) Int. Cl.
*G06F 11/00* (2006.01)
(52) U.S. Cl. .............. 714/22; 714/6.13; 714/15; 714/21
(58) Field of Classification Search ................ 714/8, 15, 714/21, 22, 6.13
See application file for complete search history.

(56) References Cited

U.S. PATENT DOCUMENTS

| | | | | |
|---|---|---|---|---|
| 6,170,066 | B1* | 1/2001 | See | 714/22 |
| 7,340,580 | B2* | 3/2008 | Kinoshita | 711/173 |
| 7,603,530 | B1* | 10/2009 | Liikanen et al. | 711/162 |
| 7,617,358 | B1* | 11/2009 | Liikanen et al. | 711/112 |
| 7,620,772 | B1* | 11/2009 | Liikanen et al. | 711/112 |
| 7,685,360 | B1* | 3/2010 | Brunnett et al. | 711/112 |
| 7,823,032 | B2* | 10/2010 | Ghotge et al. | 714/723 |
| 2003/0161186 | A1* | 8/2003 | Aasheim et al. | 365/185.29 |
| 2007/0011398 | A1* | 1/2007 | Van Niekerk | 711/111 |
| 2007/0168698 | A1* | 7/2007 | Coulson et al. | 714/5 |
| 2007/0266037 | A1* | 11/2007 | Terry et al. | 707/100 |

* cited by examiner

*Primary Examiner* — Charles Ehne
(74) *Attorney, Agent, or Firm* — Morrison & Foerster LLP (57) ABSTRACT

Disclosed herein is a technique to protect sector remapped boundary data from corruption due to catastrophic errors such as loss of power in storage disks including SATA (Serial ATA) drives. Specially, one method is provided for protecting the boundary sector data from power failure through a data recovery mechanism, namely, a boundary sector table in which the boundary sectors are pre-stored in case any power failure or loss occurs during the sector remapped write operations. In connection with the boundary sector table stored in a reserved region of the storage disk, a boundary sector information index is provided in a bridge coupled to the disk, which serves as a key to identify and retrieve the needed boundary sector data from the table for corrupted data recovery.

52 Claims, 11 Drawing Sheets

SYSTEM AND METHOD FOR DATA PROTECTION AGAINST POWER FAILURE DURING SECTOR REMAPPING

FIELD OF THE INVENTION

This relates to computer storage technologies, and more particularly, to a technique to protect sector remapped boundary data from corruption due to catastrophic errors such as loss of power in storage disks including SATA (Serial ATA) drives.

BACKGROUND OF THE INVENTION

The low-cost SATA drive technology has been widely employed for enterprise storage applications. However, most currently available SATA HDDs (Hard Disk Drives) or SDDs (Solid-State Drives) can be formatted only with a sector size of 512 bytes. This does not meet the need of most enterprise storage applications for an expanded sector size (e.g., 520 bytes, 524 bytes or 528 bytes) that provides additional bytes for data protection information to ensure data integrity. Therefore, various sector remapping mechanisms are utilized to translate between the two types of sectors. For instance, non-native or logical sectors may be emulated into physical sectors through unaligned Read-Modify-Write (RMW) operations where the two boundary sectors, i.e., a lower boundary sector and an upper boundary sector, would be read from the SATA drive before new data of the logical sectors is written into the drive, which would overwrite certain portions of the boundary sectors and leave other portions unmodified. In other words, after the write operation, the boundary sectors comprise new data of the logical sectors as well as unmodified old data of the physical sectors. While write operations are pending, especially when a number of write commands are queued in the drive, if a catastrophic error (e.g., power failure) occurs within the drive and the drive has no built-in protection mechanism against such error, the unmodified data in the boundary sectors may be corrupted during the power failure. Because generally the initiator or host is not notified of the status in the drive in the event of power failure, the initiator or host is not aware that boundary sectors are corrupted and need to be restored when it starts to re-write logical sectors of data into the drive after the power comes back up. As a result, no effort would be made to restore the corrupted data in the boundary sectors, including the above-described unmodified data portion resulting from sector remapping, thereby leaving the drive with corrupted old data in addition to the newly-written data from logical sectors. Thus, there is a need to ensure data integrity in storage disks such as SATA drives during sector remapping by protecting sector remapped boundary data from corruption due to catastrophic errors such as power failure in the drive.

SUMMARY OF THE INVENTION

Embodiments of the present invention provide a technique to protect sector remapped boundary data from corruption due to catastrophic errors such as loss of power in storage disks including SATA (Serial ATA) drives. In one embodiment, a method is provided for protecting boundary sectors from corruption due to power failure in remapping and writing logical sectors into physical sectors in a storage device, wherein the logical sectors are different from the physical sectors at least in size. This method comprises identifying a lower boundary sector and an upper boundary sectors from the physical sectors during an unaligned write operation through which the logical sectors are remapped into said physical sectors in said storage device, and creating an entry in a boundary sector table stored in the storage device, wherein the entry includes the lower boundary sector and the upper boundary sector. The method further comprises, in response to creating the entry in said boundary sector table, setting a bit in a boundary sector information index to a first value, wherein the index comprises multiple bits, each bit corresponding to a unique entry in the boundary sector table. According to the method, if a power failure warning is detected in the drive, a copy of the index is saved in a bridge coupled to the storage device, and after power comes back up, the index would be read to identify the bit having said first value, and the corresponding entry will be identified from said boundary sector table and used to restore data in the lower and upper boundary sectors. Computer-executable instructions are also provided in a computer readable storage medium for implementing various steps of the above method.

In another embodiment, a method is provided for ensuring data integrity in mapping and writing logical sectors into physical sectors of a storage device, wherein the physical sectors include a lower boundary sector and an upper boundary sector, and the logical sectors and the physical sectors differ in size so that after said mapping and writing, at least a portion of said lower boundary sector or said upper boundary sector remains unmodified. This method comprises detecting a warning for power failure in the storage device during mapping and writing the logical sectors into the physical sectors, and storing a boundary sector information index in a bridge coupled to the storage device, wherein the index contains multiple bits, each bit corresponding to a unique entry in a boundary sector table in said storage device, and the bridge is configured to recover the unmodified portion in accordance with the boundary sector table after the power comes back up. The method further comprises reading a bit from the index after the power comes back, determining whether said bit has a first value indicating its corresponding entry in said boundary sector table is valid, and if the bit is determined to have the first value, identifying said corresponding entry in said boundary table, and using the entry to restore data in the lower boundary sector and the upper boundary sector before writing said logical sectors into the drive. Computer-executable instructions are also provided in a computer readable storage medium for implementing various steps of the above method.

Yet another embodiment of the present invention provides an apparatus configured for remapping and writing logical sectors into physical sectors in a storage device, wherein the logical sectors are different from the physical sectors at least in size. The apparatus comprises a processor, and a memory accessible to said processor, wherein the processor is configured to receive said logical sectors from an initiator; determine said physical sectors in said storage device for an unaligned write operation through which said logical sectors are remapped into said physical sectors in said storage device; identify a lower boundary sector and an upper boundary sectors from said physical sectors; and create an entry in a boundary sector table stored in said storage device, said entry including said lower boundary sector and said upper boundary sector.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the present invention relate to a technique to protect sector remapped boundary data from corruption due to catastrophic errors such as loss of power in storage disks, e.g., SATA (Serial ATA) drives. When logical sectors of data are remapped and written into the physical sectors of a disk drive in an unaligned write operation, at least a portion of the boundary sectors, whether the lower boundary sector or upper boundary sector, will remain unmodified. If data in this unmodified portion is lost or corrupted due to power failure, such boundary sector data cannot be restored, which will eventually cause system-level data corruption, as the initiator or host is not aware of the data loss and may continue to read the corrupted data as if it were good data. Therefore, embodiments of the present invention provide a method of protecting the boundary sector data from power failure through a data recovery mechanism, namely, a boundary sector table in which the boundary sectors are pre-stored in case any power failure or loss occurs during the sector remapped write operations. In connection with the boundary sector table stored in a reserved region of the storage disk, a boundary sector information index is provided in a bridge coupled to the disk, which serves as a key to identify and retrieve the needed boundary sector data from the table according to embodiments of the invention.

Although embodiments of the invention may be described and illustrated herein in terms of remapping 520-byte logical sectors into 512-byte physical sectors, it should be understood that embodiments of this invention are not so limited, but can be additionally applicable to logical and physical sectors of variable sizes. In addition, embodiments of the invention may be described and illustrated herein in terms of specific data structures such as boundary sector table (BST), boundary sector entry (BSE) and boundary sector information bit mask (BSI_BM), or hardware implementation in a storage bridge and/or a disk drive (e.g., HDD or SDD), but it should be understood that various software and hardware, system components and configurations can be utilized for different implementations.

Figure 1:
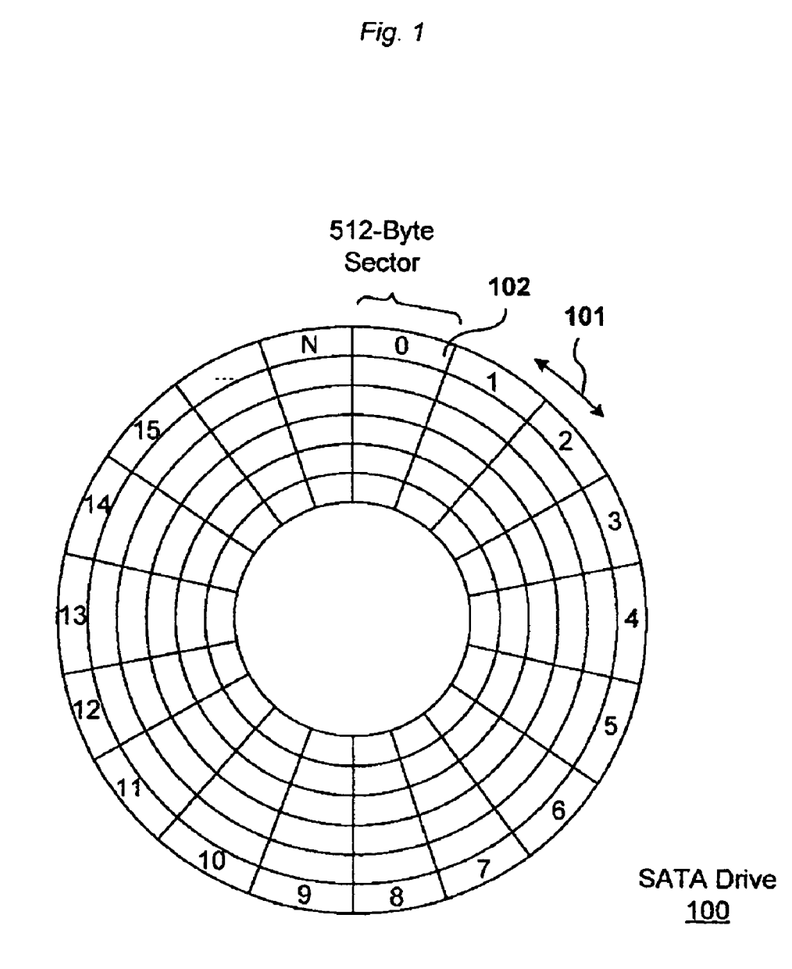
FIG. 1 depicts an exemplary SATA disk drive for implementing various embodiments of the present invention.

Referring to FIG. 1, an exemplary SATA disk drive for implementing various embodiments of the present invention will be described. As shown in FIG. 1, a SATA disk drive 100 is conceptually considered to consist of a number of tracks that are each divided into sectors. A track is a circular band on the surface of a disk platter, such as track 101, an outer-circumferential band on an SATA disk-drive platter. Each track is divided into radial sections, called sectors, such as sector 102, the first sector of the first track 101. In general, disk access operations occur at the granularity of sectors. Modern disk drives may include a number of parallel-oriented platters. All like-numbered tracks on both sides of all of the parallel platters together compose a cylinder. In SATA disk drives, as illustrated in FIG. 1, each sector of each track generally contains a data payload of 512 bytes. The sectors contain additional information, including a sector index and error-detection and/or error-correction information, which is generally maintained and used by the disk-drive controller, and may not be externally accessible. It should be understood that the SATA drive in FIG. 1 is for illustration only, and embodiments of the present invention are not so limited, but can include many variations in terms of specific implementations in the disk drives. For example, the sector layout in SSDs (Solid State Drives) is different, which only includes a linear map of memory with no platters or tracks.

Figure 2:
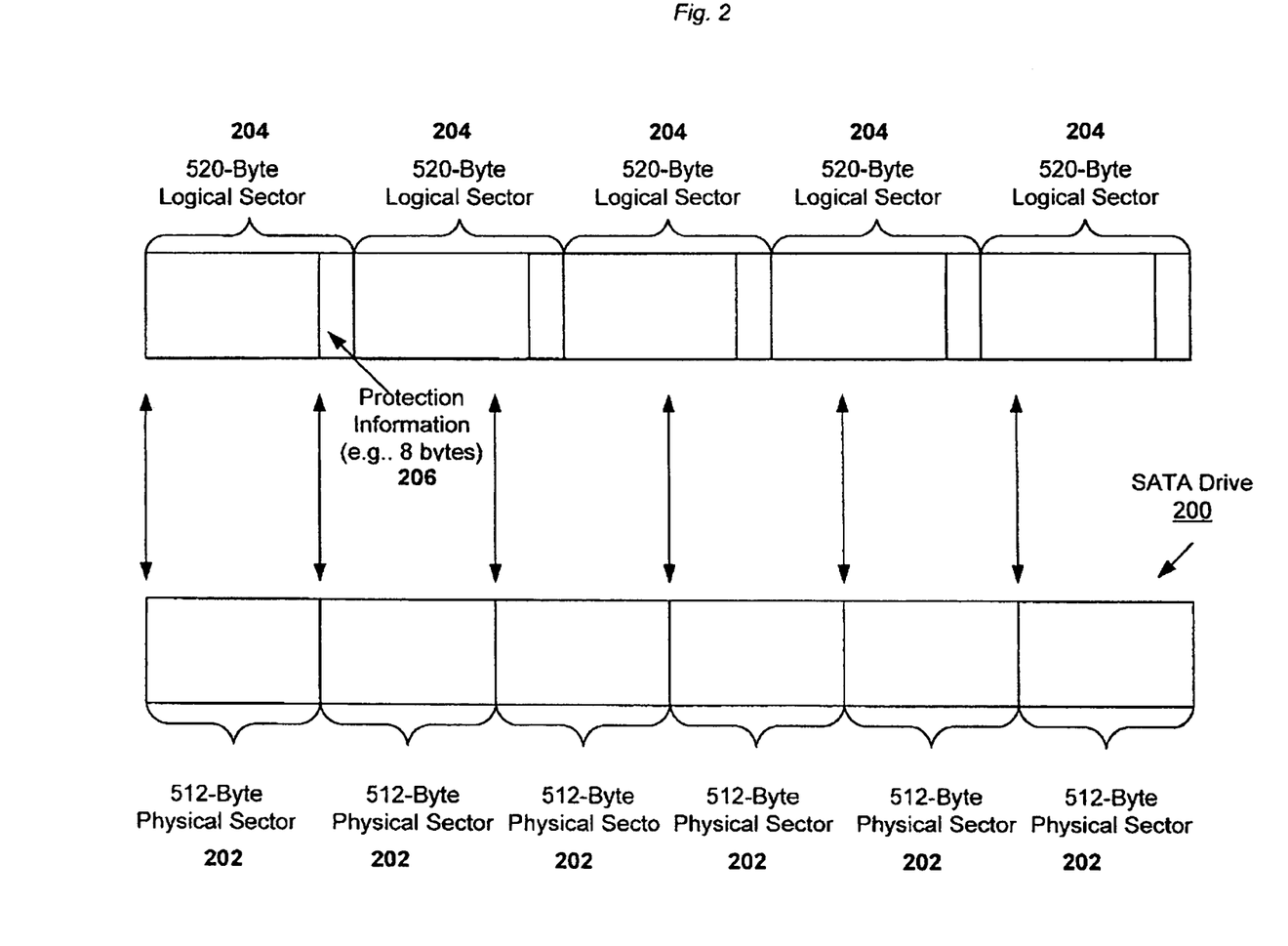
FIG. 2 is a block diagram demonstrating differences between exemplary logical sectors and physical sectors according to various embodiments of the present invention.

As aforementioned, most enterprise storage applications utilize expanded sectors or logical sectors having more than 512 bytes per sector. FIG. 2 is a block diagram demonstrating exemplary logical sectors as compared with physical sectors of 512 bytes typical of SATA disk drives according to various embodiments of the present invention. As shown in FIG. 2, a SATA disk drive comprises a plurality of physical sectors or 512-byte sectors 202. In contrast, enterprise storage applications tend to add protection information, such as the 8 bytes of metadata 206 in FIG. 2, for each data sector to form a logical or virtual sector. Each logical sector 204, as shown in the example of FIG. 2, has a size of 520 bytes. Due to the different sector size, logical sectors of 520 bytes cannot be mapped into physical sectors of 512 bytes on a one-to-one basis. Instead, adjustment or alignment of data is needed when data blocks in the form of logical sectors are written into the physical sectors of SATA drives. For instance, when one 520-byte logical sector is written into a SATA disk, the first 512 bytes will take one physical sector and the additional 8 bytes will take partial space in a neighboring physical sector.

Figure 3:
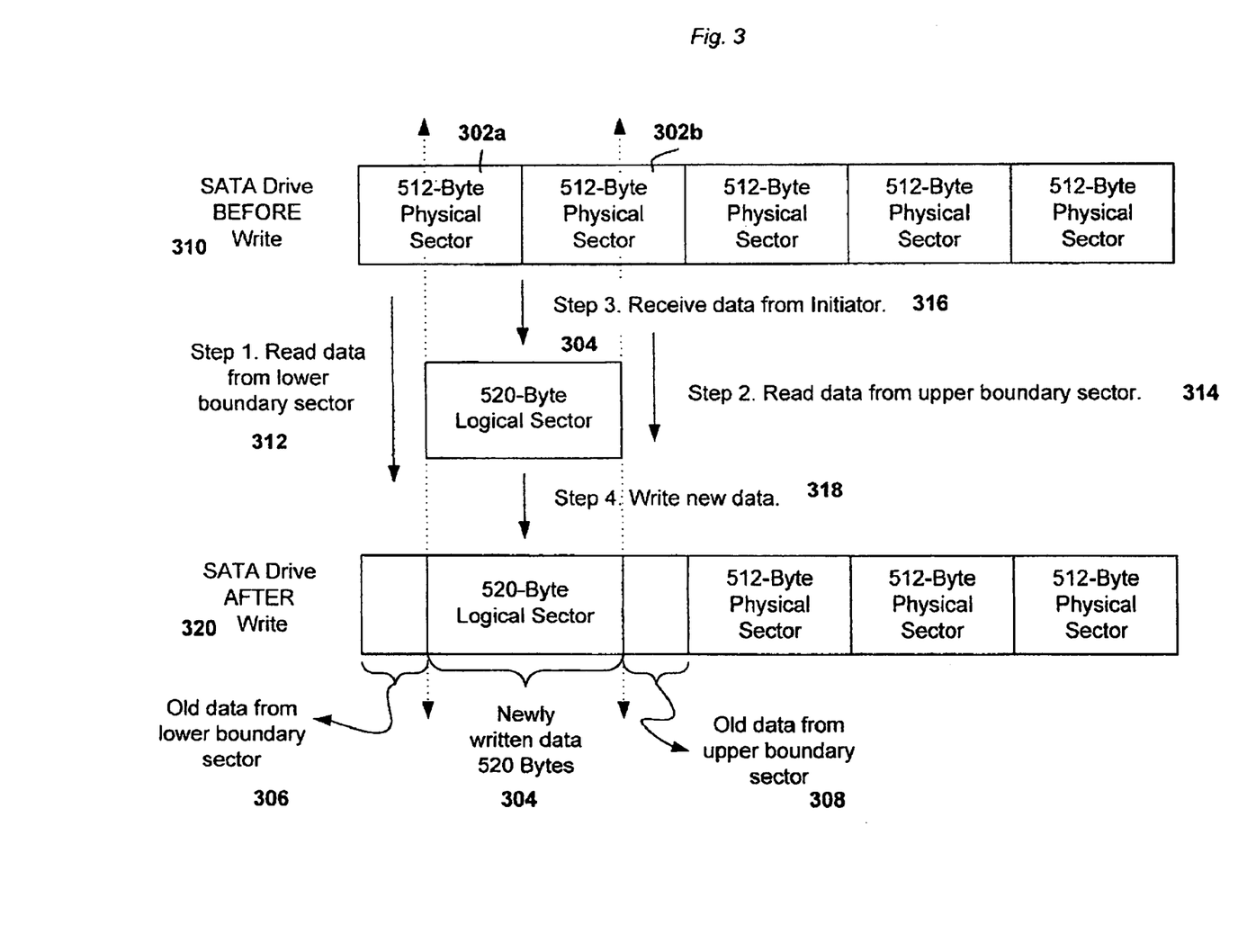
FIG. 3 is a block diagram illustrating an exemplary sector remapping process involving Read-Modify-Write (RMW) operations according to various embodiments of the present invention.

FIG. 3 provides an exemplary sector remapping process in which Read-Modify-Write (RMW) operations are performed according to various embodiments of the present invention. As shown in FIG. 3a, a SATA disk drive comprises multiple 512-byte physical sectors, for example, sectors 302a and 302b. When a number of logical sectors of data, such as a 520-byte logical sector 304, are written into the disk, these sectors need to be remapped due to their size difference as compared to the physical sectors. For example, when the 520-byte sector 304 is written into a SATA disk, this logical sector can take space between two 512-byte physical sectors, such as sectors 302a and 302b. In that case, sector 302a is referred as the lower boundary sector, and sector 302b the upper boundary sector. As shown in FIG. 3, writing the 520-byte sector 304 into the disk results in overwriting certain old data in sectors 302a and 302b, while leaving unmodified a portion of old data 306 from the lower boundary sector 302a and a portion of old data 308 from the upper boundary sector 302b. Typically, such write performance employs a Read Modify Write (RMW) algorithm, as exemplified in steps 312 to 316 in FIG. 3a. Specifically, this RMW algorithm starts with an exemplary block 310 showing the disk drive before the write operation. At step 312, the old or unmodified data portion 306 from the lower boundary sector 302 is read and placed into a data buffer (not shown in FIG. 3a). Similarly, the old or unmodified data portion 308 is read from the upper boundary sector 302b and placed into the data buffer at step 314. Subsequent to the two reads, at step 316 new data in the form of logical sectors is received from an initiator (e.g., a host application). At step 318, such new data from the logical sector 304 is placed into the buffer along with the two old data portions 306 and 308 to form two new 512-byte physical sectors. Finally, these two newly formed 512-byte sectors are written into the disk drive, as shown in the exemplary block 318. FIG. 3a shows a simple example of writing only one 520-byte sector into two 512-byte sectors, but it should be understood that the RMW algorithm scales naturally to any number of sectors. In one implementation, the required calculations to translate logical sectors into physical sectors are automatically performed by a bridge coupled to the disk drive (see FIG. 10). Further, optimization (e.g., avoiding one read when the lower or upper boundary sector is aligned with one logical sector) and error handling techniques are employed as well in the sector remapping process.

The problem with the above-exemplified writing operations is, when writing multiple logical sectors of data into the drive, it may take some time, and during this time period, if any catastrophic error (e.g., power failure) occurs in the drive, data in any sectors associated with the write operation, including the boundary sectors (e.g., sectors 302a and 302b), particularly the unmodified data portions (e.g., old data 306 and 308), may be corrupted. Unlike the logical sectors of new data that is already stored in the bridge or can be re-loaded from the initiator (e.g., a host application), the corrupted boundary sector data cannot be restored because the original data in the drive has been overwritten, at least partially, by the new logical sectors and there is no copy of such data to recover from. One solution is to have a copy of such boundary sector data (e.g., data and addresses of boundary sectors) stored in a reserved region within the drive in order to allow for data recovery after catastrophic errors such as power failure in the drive.

Figure 4:
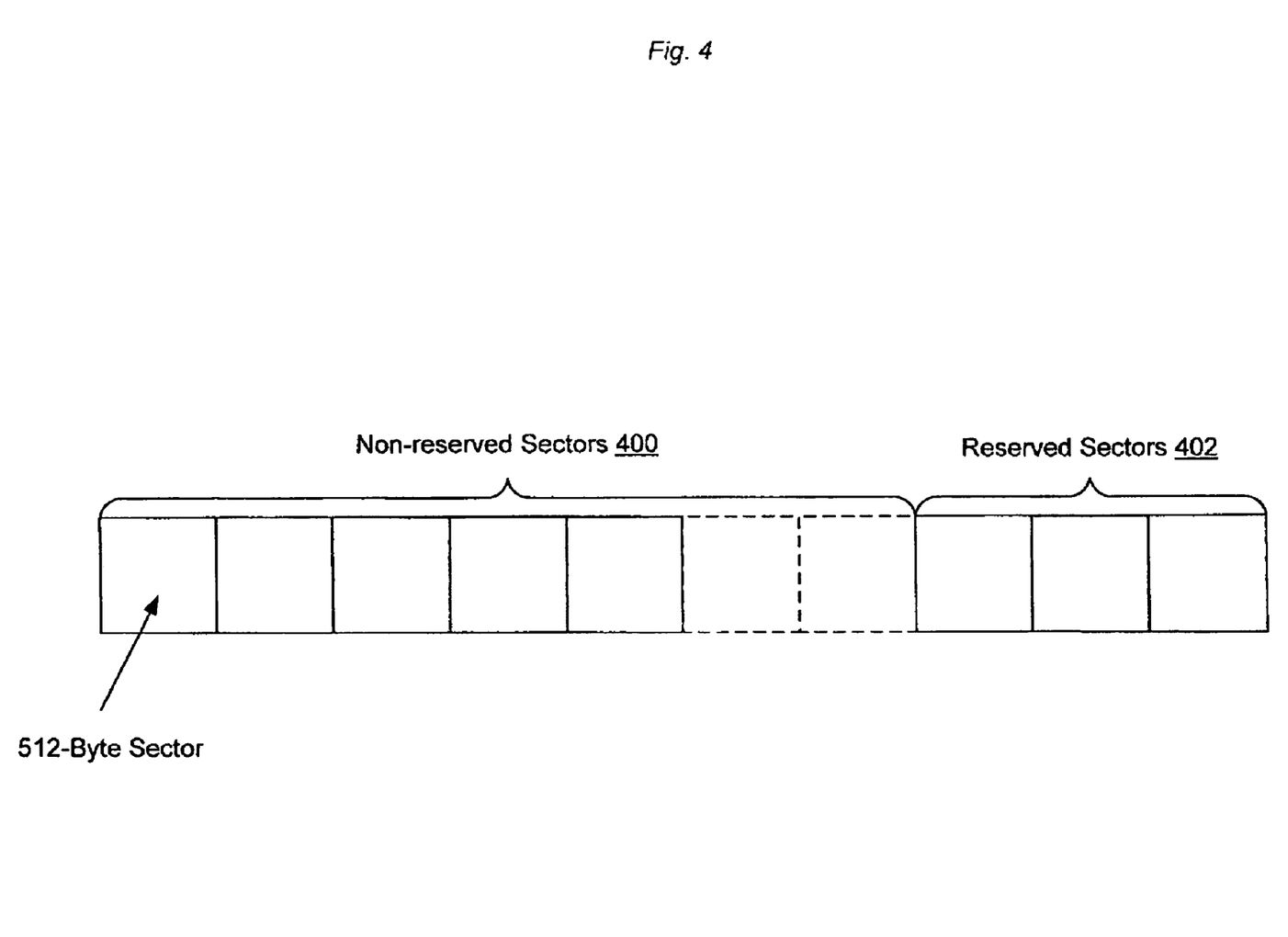
FIG. 4 is a block diagram illustrating an exemplary SATA disk drive having non-reserved sectors and reserved sectors to enable protection of sector remapped boundary data from power failure or other catastrophic error in according to various embodiments of the present invention.

In FIG. 4, physical sectors in a storage disk such as a SATA drive is divided into non-reserved sectors 400 and reserved sectors 402. The reserved sectors 402 are pre-served for storing copies of boundary sector data and associated control information for pending unaligned write operations. Typically, these sectors comprise physical sectors located towards the end of the drive. In one embodiment, the reserved sectors are determined by a storage bridge when the bridge reads the actual capacity of the drive and presents a reduced capacity to the initiator (e.g., a host application). In that situation, the initiator is unaware of the fact that certain sectors, namely, the difference between the actual drive capacity and presented capacity, are reserved for later use by the bridge. Alternatively, the reserved sectors can be determined during system initialization where the bridge specifically requests a portion of the drive to be allocated for storing data of boundary sectors.

Figure 5:
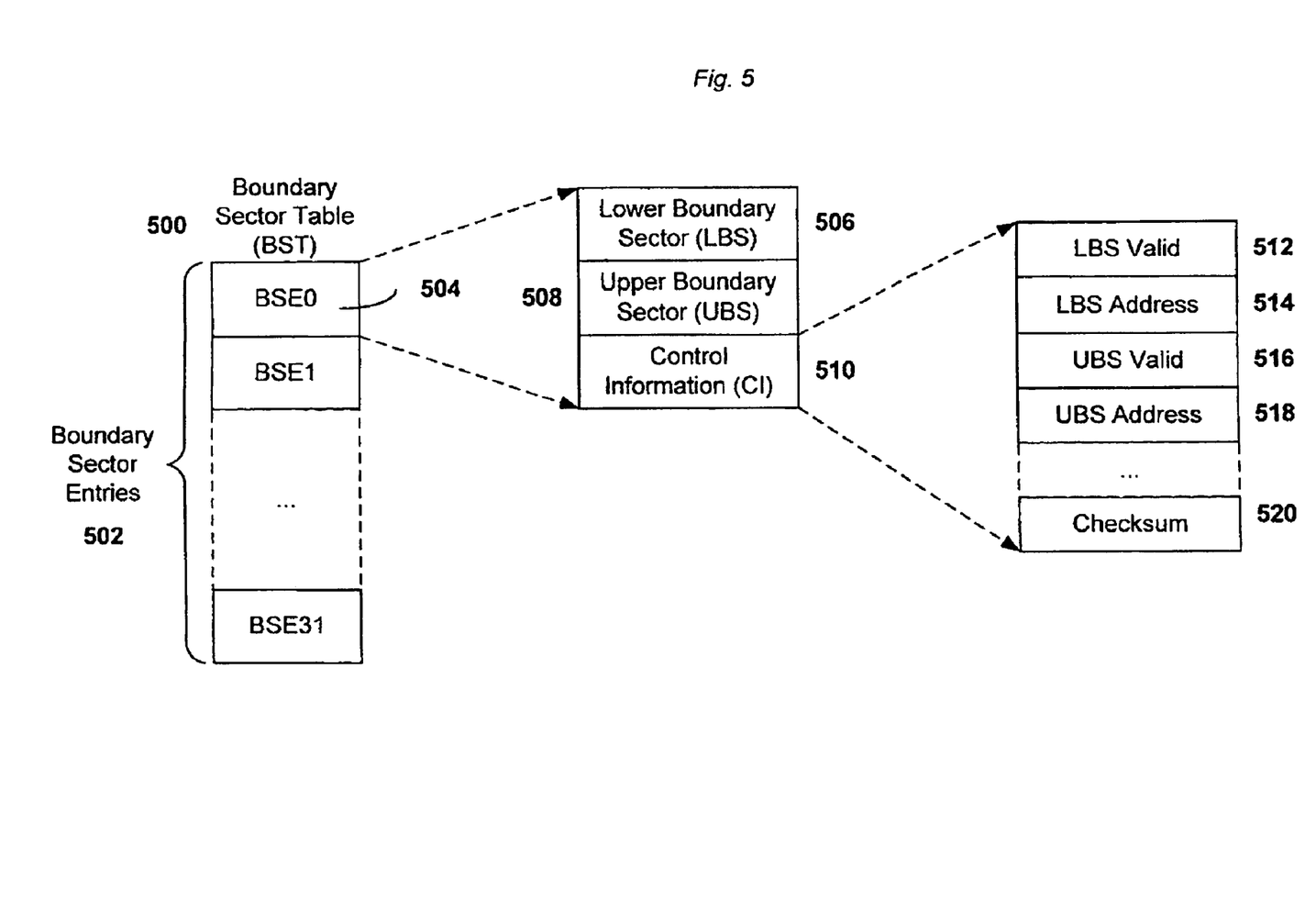
FIG. 5 is a block diagram demonstrating an exemplary data structure of boundary sector table (BST) that is utilized in sector remapping for protecting sector remapped boundary data from corruption due to power failure or other catastrophic error according to various embodiments of the present invention.

FIG. 5 shows an exemplary data structure, i.e., boundary sector table (BST) 500, for storing boundary sector information in the reserved sectors of the drive according to various embodiments of the present invention. A BST contains multiple boundary sector entries (BSE) and each BSE is created and inserted into the table corresponding to an unaligned write operation of logical sectors into the drive. For example, the BST 500 in FIG. 5 contains a total of 32 boundary sector entries 502 (BSE0, BSE1, . . . BSE31) associated with 32 corresponding queued write operations of logical sectors into the drive. Each BSE 504 includes a lower boundary sector (LBS) 506, an upper boundary sector (UBS) 508 and related control information 510. The control information 510 typically specifies parameters associated with the boundary sectors, such as the addresses of lower and upper boundary sectors within the drive, validity of those sectors for purposes of data recovery, and verification of those sectors to ensure data integrity.

As illustrated in FIG. 5, the control information 510 contains LBS validity 512, an LBS address 514, UBS validity 516, an UBS address 518 and a checksum 520. The parameter of LBS validity 512 indicates whether the lower boundary sector is valid. The lower boundary sector is invalid when the beginning of the logical sectors to be written into the drive is aligned with the beginning of the lower boundary sector. In the event of such alignment, the entire lower boundary sector will be overwritten with no unmodified data portion left, and as a result, there is no need to recover data in the lower boundary sector even if the lower boundary sector is corrupted during power failure. Consequently, if the bridge detects from the parameter of LBS validity 512 that the lower boundary sector is invalid, the bridge will not restore the lower boundary sector data after the power comes back up. Similarly, the upper boundary sector is invalid if the end of the logical sectors is aligned with the end of the upper boundary sector, thereby eliminating the need to restore data from the upper boundary sector despite the power failure. Based on the element of UBS validity 516, the bridge can determine whether to recover data of the upper boundary sector after the power comes back up. The LBS address 514 and UBS address 518 indicate the respective addresses of lower boundary sector and upper boundary sector. Typically, a Logical Boundary Address (LBA) is used to represent these address parameters. Checksum 520 is a parameter to be included in the control information 510 for purposes of data integrity. Specifically, a value of checksum 520 is calculated and pre-stored in the control information 510 when the boundary sectors are read from the drive and a BSE is created and inserted into the BST. Subsequently, when the boundary sectors need to be recovered from the BSE in the BST in the reserved sectors after a catastrophic error, for example, a power failure, another checksum value is calculated and verified with the pre-stored checksum value as described above to detect any data inconsistency in the boundary sectors.

Figure 6:
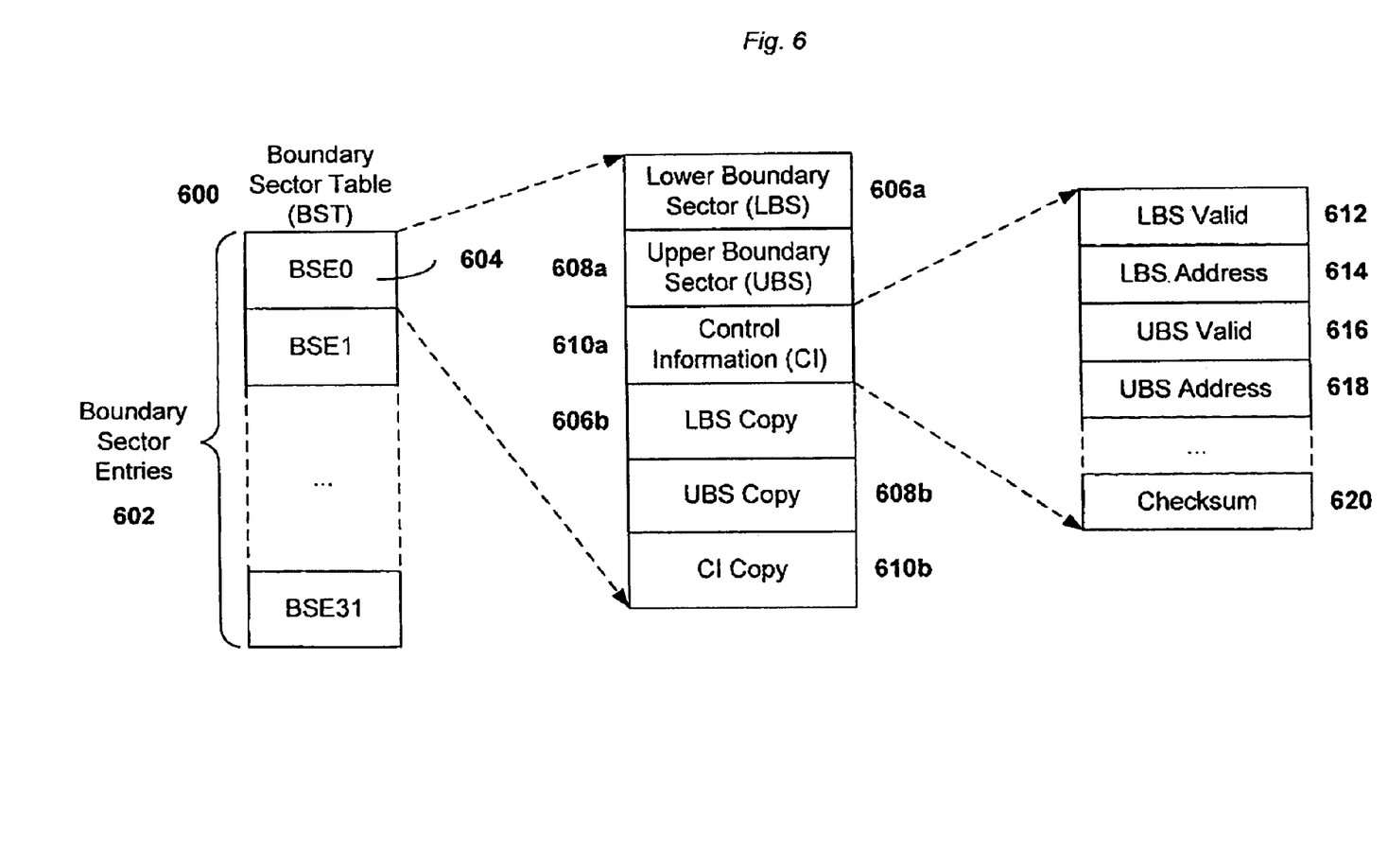
FIG. 6 is a block diagram demonstrating another exemplary data structure of boundary sector table (BST) that is utilized in sector remapping for protecting remapped boundary sectors from corruption due to power loss or other catastrophic error according to various embodiments of the present invention.

FIG. 6 provides an alternative boundary sector table (BST) data structure 600 for storing boundary sector information in the reserved sectors of the drive according to various embodiments of the present invention. Compared with the BST 500 shown in FIG. 5, each entry of the BST 600 includes a dual or redundant copy of boundary sector data for additional protection against corruption caused by power failure. In case there is an uncorrectable error when reading a boundary sector from the BST, the redundant copy can be used to improve the overall system robustness. As shown in FIG. 6, the BSE 604 includes two copies of data for each parameter described above with reference to FIG. 5, namely, LBS 606a and LBS copy 606b, UBS 608a and UBS copy 608b, control information (CI) 610a and CI copy 610b. It should be understood that, if needed, additional copies of boundary sector data may be included in each BSE, although such increased redundancy also results in reduction in drive capacity.

Figure 7:
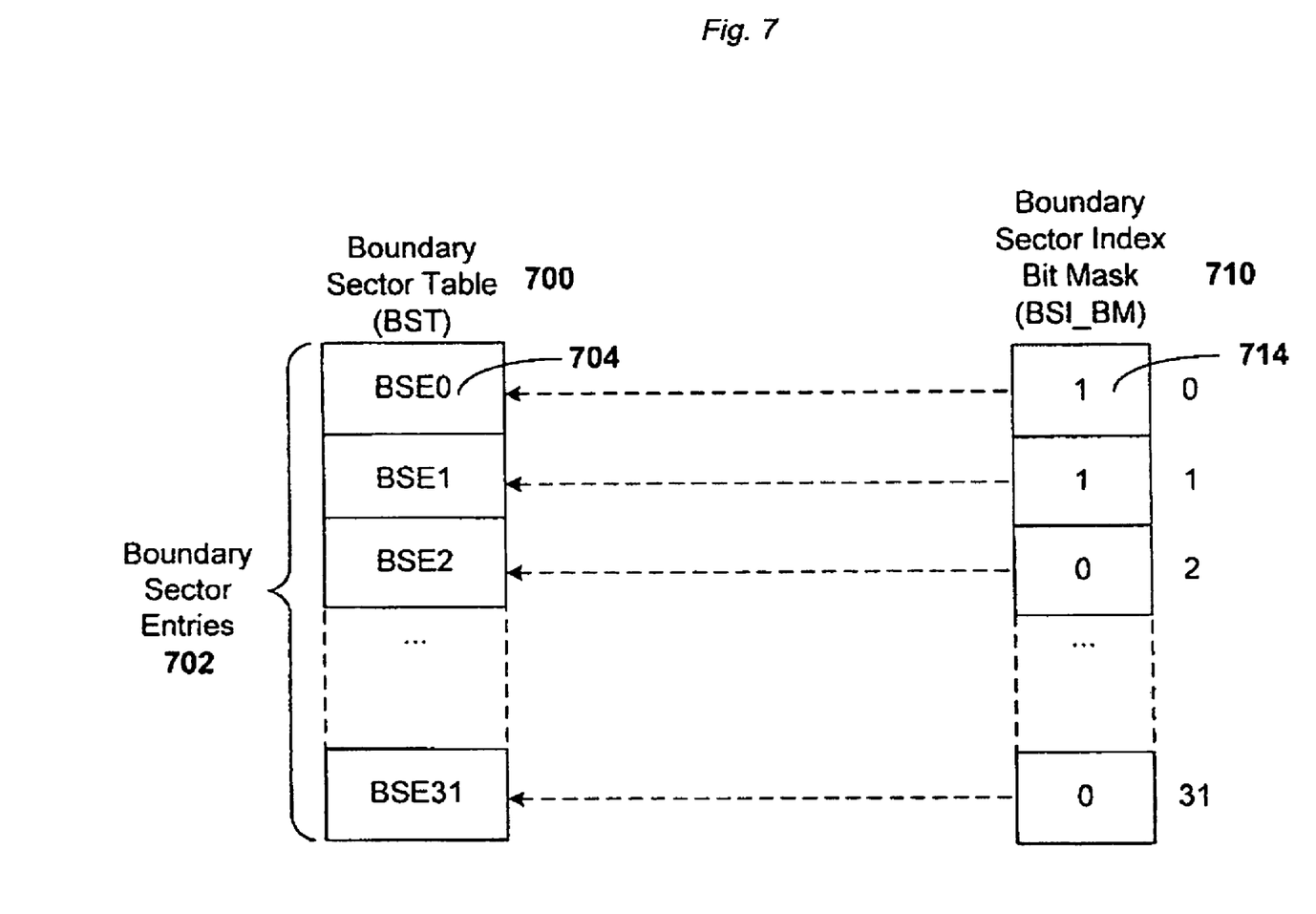
FIG. 7 is a block diagram showing an exemplary data structure of boundary sector index bit mask (BSI_BM) that is utilized in sector remapping for protecting sector remapped boundary data from corruption due to power failure or other catastrophic error according to various embodiments of the present invention.

With the BST in the reserved sectors of the drive, the boundary sector data can be recovered after being corrupted by catastrophic errors such as power failure in the drive. Since the BST can comprise multiple BSEs, the bridge needs to identify which BSE to use for restoring the corrupted boundary sectors. To that end, another data structure, boundary sector index bit mask (BSI_BM), as exemplified in FIG. 7, is employed according to various embodiments of the invention. In FIG. 7, an exemplary boundary sector index bit mask (BSI_BM) 710 is illustrated, which includes numerous individual bits 714. Each bit 714 corresponds to a unique BSE 704 of the BST 700, (e.g., bit 0 to BSE0, bit 1 to BSE1, ... bit 31 to BSE31), and has a pre-set value of 1 or 0. The pre-set bit value indicates whether the corresponding BSE is a valid entry. For example, if the bit value of bit0 is 1, that means the corresponding BSE, BSE0, is valid and the associated boundary sectors need to be recovered in the non-reserved region of the drive when the interrupted write operation is re-assumed after the power failure. Once the boundary sectors are recovered from BSE0, BSE0 becomes invalid and the corresponding bit0 in the BSI_BM 710 should be cleared accordingly. For instance, the bit value of bit0 can be re-set to 0. As a consequence, next time when the bridge reads the BSI_BM 710, the bridge can determine from the 0 value of bit0 that BSE0 is invalid and no boundary data recovery is needed. Each bit of the BSI_BM is updated in response to the creation or deletion of its corresponding BSE in the BST stored in the drive. In one embodiment, the BSI_BM 710 is stored in a local non-volatile memory (e.g., flash) in the bridge (see FIG. 10). Alternatively, the BSI_BM 710 is first created and stored in the drive in response to the creation, deletion or update the boundary sector entries 702 in the BST 700, and upon a power failure warning received by the bridge, a copy of the BSI_BM 710 is written into a local flash of the bridge for later use. Usually the time interval between the power failure warning and power loss is very short. Despite such a short time limit, however, the BSI_BM can be written into the bridge before the power is gone, due to its small size, only 4 bytes as shown in FIG. 7 for example.

With the above-described data structures of BST and BSI_BM, the boundary sector data can be protected against catastrophic errors such as power failure during write operations in a sector remapping process according to various embodiments of the present invention. This will be described in detail in the following paragraphs with reference to FIGS. 8a-b and 9.

Figure 8A:
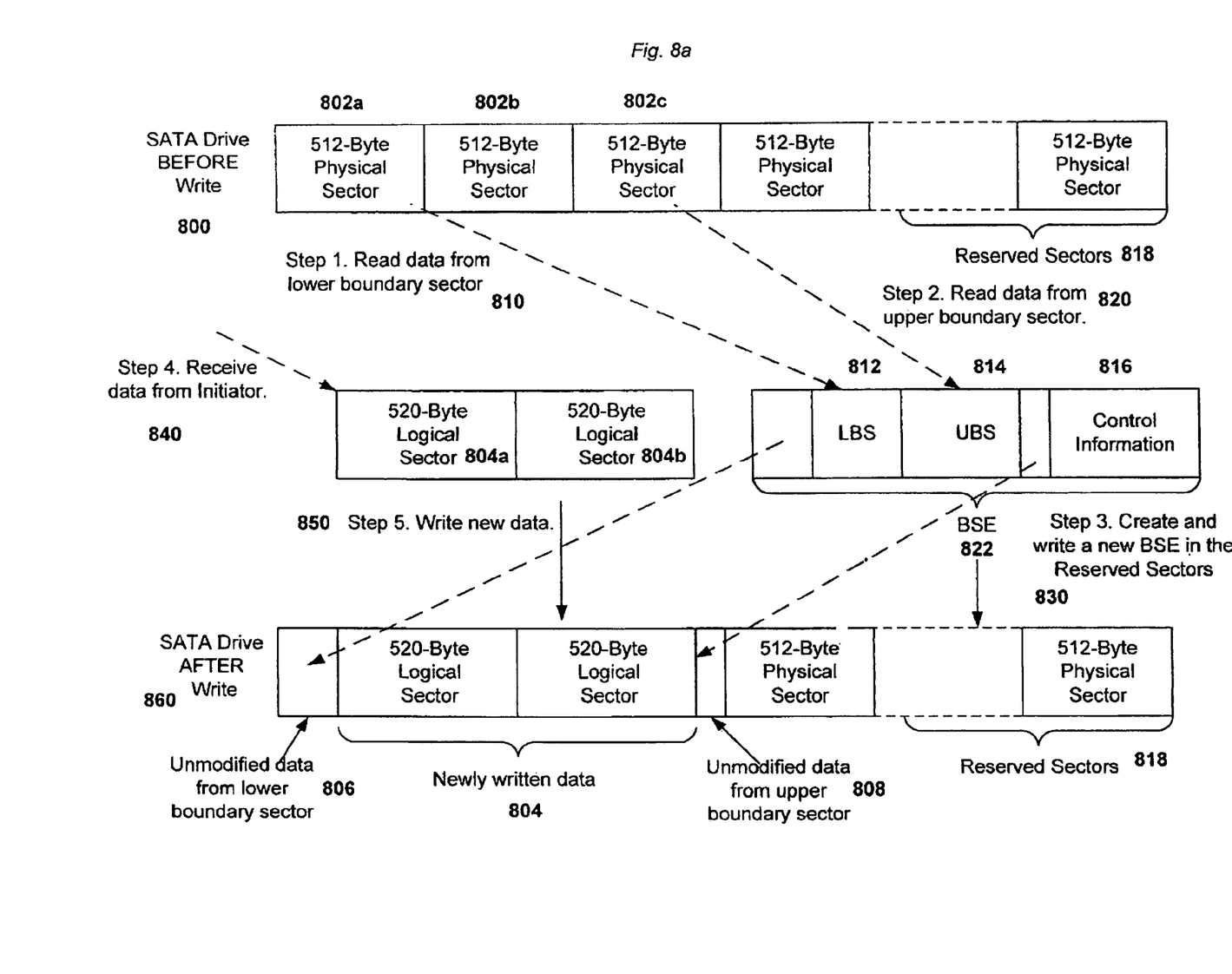
FIGS. 8a-b provide an exemplary sector remapping process using the data structures of BST and BSI_BM shown in FIGS. 5-7 to enable protection of sector remapped boundary data from power failure or other catastrophic error according to various embodiments of the present invention.
Figure 8B:
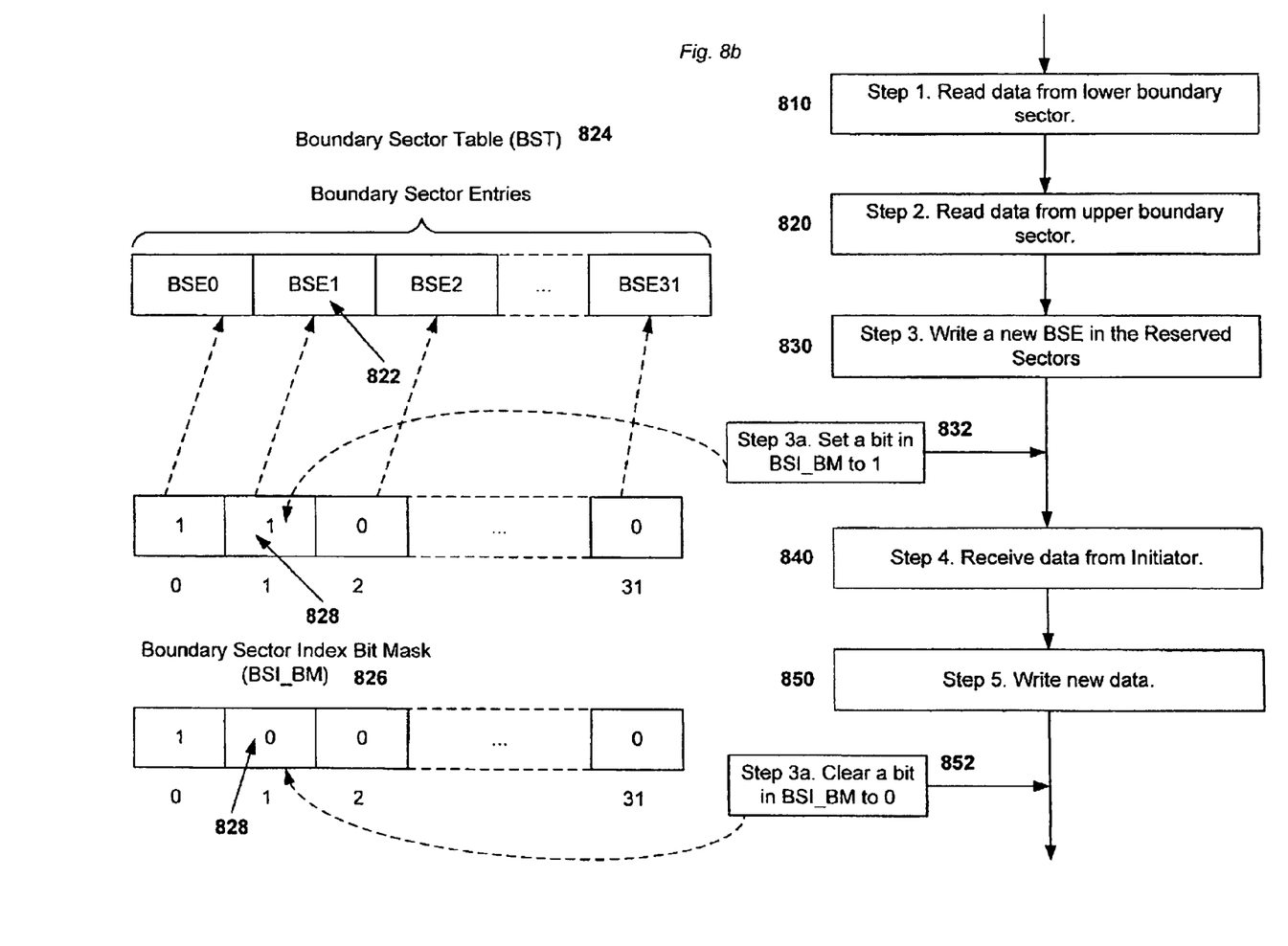

In FIGS. 8a-b, an exemplary sector remapping process is illustrated, in which two 520-byte logical sectors 804a and 804b are mapped and written into three 512-byte physical sectors, i.e., sectors 802a, 802b and 802c, using a boundary sector table (BST) 824 and corresponding boundary sector index bit mask (BSI_BM) 826 to protect boundary sectors 802a and 802c from corruption caused by catastrophic errors such as power failure according to various embodiments of the present invention. As shown in FIG. 8a, a SATA drive, whether in before-write status 800 or after-write status 860, comprises multiple 512-byte physical sectors, of which certain sectors (e.g., reserved sectors 818) are reserved for storing a BST comprising numerous boundary sector entries. The non-reserved sectors, such as sectors 802a, 802b and 802c, are used to store new data to be written into the drive, such as data in the logical sectors 804a and 804b. As aforementioned, without alignment, when writing two 520-byte logical sectors 804a and 804b into the drive, a majority portion of the three 512-byte physical sectors 802a-c will be overwritten, while certain portions will remain unmodified in the boundary sectors, such as the unmodified data portion 806 in the lower boundary sector 802a and unmodified data portion 808 in the upper boundary sector 802c. Therefore, the boundary sectors 802a and 802c need to be protected in case any catastrophic error such as power failure occurs during the write operations associated with the logical sectors 804a and 804b, which may corrupt the unmodified data portions 806 and 808. As shown in FIG. 8a, the boundary sector data is copied into a boundary sector entry, e.g., BSE 822, during the write operations in a sector remapping process comprising steps 810-850.

Specifically, the process starts with step 810, at which the bridge reads data from the lower boundary sector 802a and places the data in a buffer or static RAM in the bridge. Similarly, at step 820, the bridge reads data from the upper boundary sector 802c, and places the data in the buffer or static RAM within the bridge. Subsequently, at step 830, the BSE 822 is created by copying the lower boundary sector 802a into the LBS 812 and the upper boundary sector 802c into the UBS 814, and further, inserting control information 816 associated with the boundary sectors, which includes addresses and validity of these sectors and a checksum for purposes of data integrity, and the newly-created BSE 822 is inserted into the BST 824 that is stored in the reserved sectors 818 of the drive. In response to the newly-created BSE 822 (e.g., BSE1), the corresponding bit 828 (e.g., bit1) in the BSI_BM 826 is set to 1 at step 832 (see FIG. 8b), to indicate the validity of the BSE. At step 840, new data in the form of logical sectors (e.g., sectors 804a and 804b) is received from an initiator (e.g., a host application). Such data will be written into the drive at step 850, which can take some time depending on the size of logical data blocks. If the logical sectors of data are written into the drive successfully without any interruption (e.g., power failure), at step 852, the boundary sector index bit 828 (e.g., bit1) will be cleared to 0, so as to indicate the corresponding BSE (e.g. BSE1) in the BST is no longer valid and no data recovery is needed for the associated boundary sectors in case any power failure occurs in later operations. The boundary sector index bit 828 (e.g., bit1) will also be cleared to 0, as will be detailed below with reference to FIG. 9, if the write operation is interrupted by power failure, and the boundary sector data is successfully recovered from a BSE after the power comes back up. As aforementioned, a copy of the BSI_BM would be written into the bridge upon a power failure warning.

Figure 9:
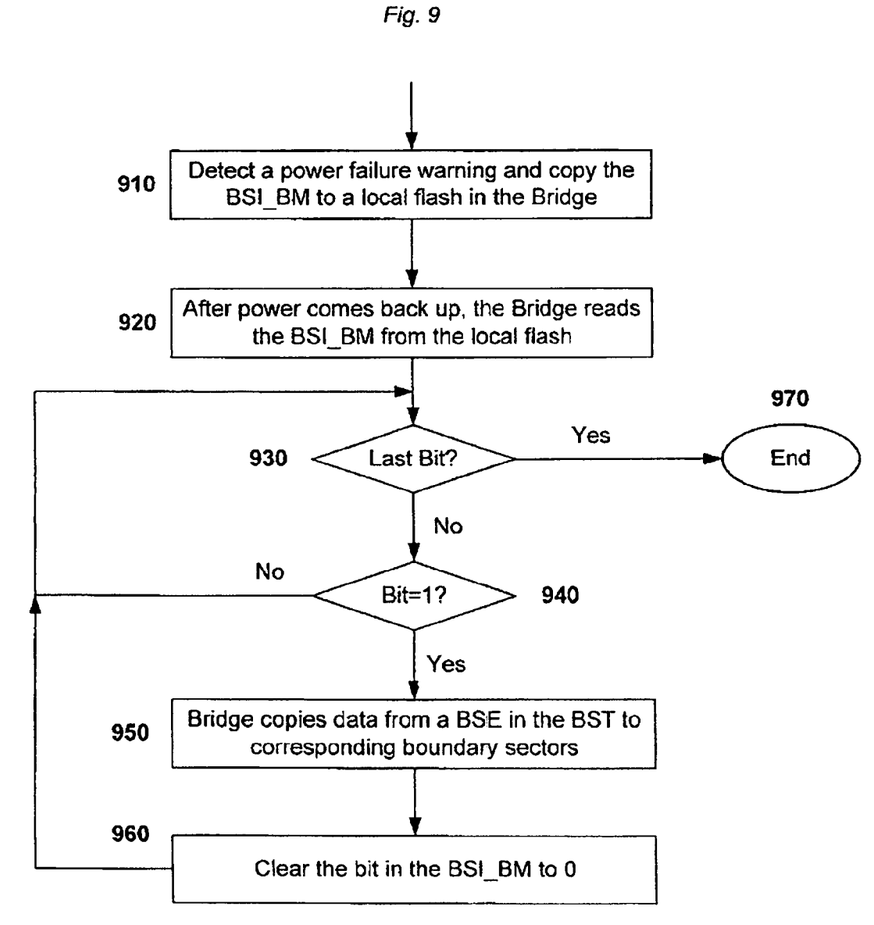
FIG. 9 provides a flow chart demonstrating an exemplary process for protecting boundary sectors from corruption due to power failure during write operations in a sector remapping process according to various embodiments of the present invention.

FIG. 9 provides an exemplary process for recovering and restoring data in the corrupted boundary sectors due to power failure while writing logical sectors of data into the drive according to various embodiments of the present invention. As shown in FIG. 9, the process starts at step 910 in which a power failure warning is detected from the drive, and upon detection of such a warning, the bridge will check its local flash drive to ensure a copy of the BSI_BM exists for later use. In one embodiment, the bridge will write a copy of the BSI_BM into its local flash upon detection of the power failure warning and before the power is lost completely. As aforementioned, when the write operation is interrupted due to the power failure, certain data in the unmodified data portions of boundary sectors (e.g., data portions 806 and 808 in FIG. 8*a*) may get lost or corrupted. Such lost or corrupted data need to be restored in the boundary sectors after the power comes back up. Therefore, at step 920, the bridge reads the BSI_BM in its flash memory to identify the corresponding BSE from which boundary sectors can be restored. At step 930, for each bit read from the BSI_BM, the bridge determines whether it is the last bit, and if so, the process ends at step 970. Otherwise, the bridge further determines whether the bit value is 1, and if not, the bridge proceeds to the next bit and repeats the above step 930. If the bit value is determined to be 1, that means the corresponding BSE in the BST is valid and boundary sector data needs to be recovered in the corrupted boundary sectors. At step 950, the bridge will read boundary sector data from the BSE corresponding to the bit having value of 1 and write such data in the corresponding boundary sectors. Subsequent to a successful data recovery of boundary sectors, at step 960, the corresponding bit is cleared by re-setting its value to 0 in the BSI_BM, and the bridge proceeds to the next bit and repeats the above steps 930-960.

Using the example in FIGS. 8*a-b* to further illustrate the above process, if a power failure warning is detected while logical sectors 804*a* and 804*b* are being written into physical sectors 802*a*, 802*b* and 802*c*, the bridge will first check and ensure a copy of BSI_BM 826 is stored therein. The BSI_BM 826, as described above, includes numerous bit values to indicate which BSE in the BST to use for boundary data recovery. After the power comes back, the bridge first reads the BSI_BM 826 to find that the value of bit1 is 1, which indicates the corresponding BSE1 is a valid entry. Then the bridge retrieves the BSE1 from the BST stored in the reserved sectors of the drive, reads the LBS 812 and UBS 814 from the BSE1, and based on the control information 816, identify the boundary sectors (e.g., sectors 802*a* and 802*c*) for restoring such data. Before the entry is used for restoring data, data integrity of such entry is checked through parameters, such as a checksum in the control information, and in some circumstance if there is error with one copy of boundary sectors in the entry, the other redundant copy can be used. If the control information 816 shows, for example, that LBS is invalid, that means the beginning of logical sectors 804*a* and 804*b* is aligned with the beginning of lower boundary sector 802*a* and no writing of LBS 812 back into sector 802*a* is needed. After the boundary sectors (e.g., sectors 802*a* and 802*c*) are restored, the BSE1 is no longer needed and the corresponding bit1 is cleared to 0 accordingly at step 852.

Figure 10:
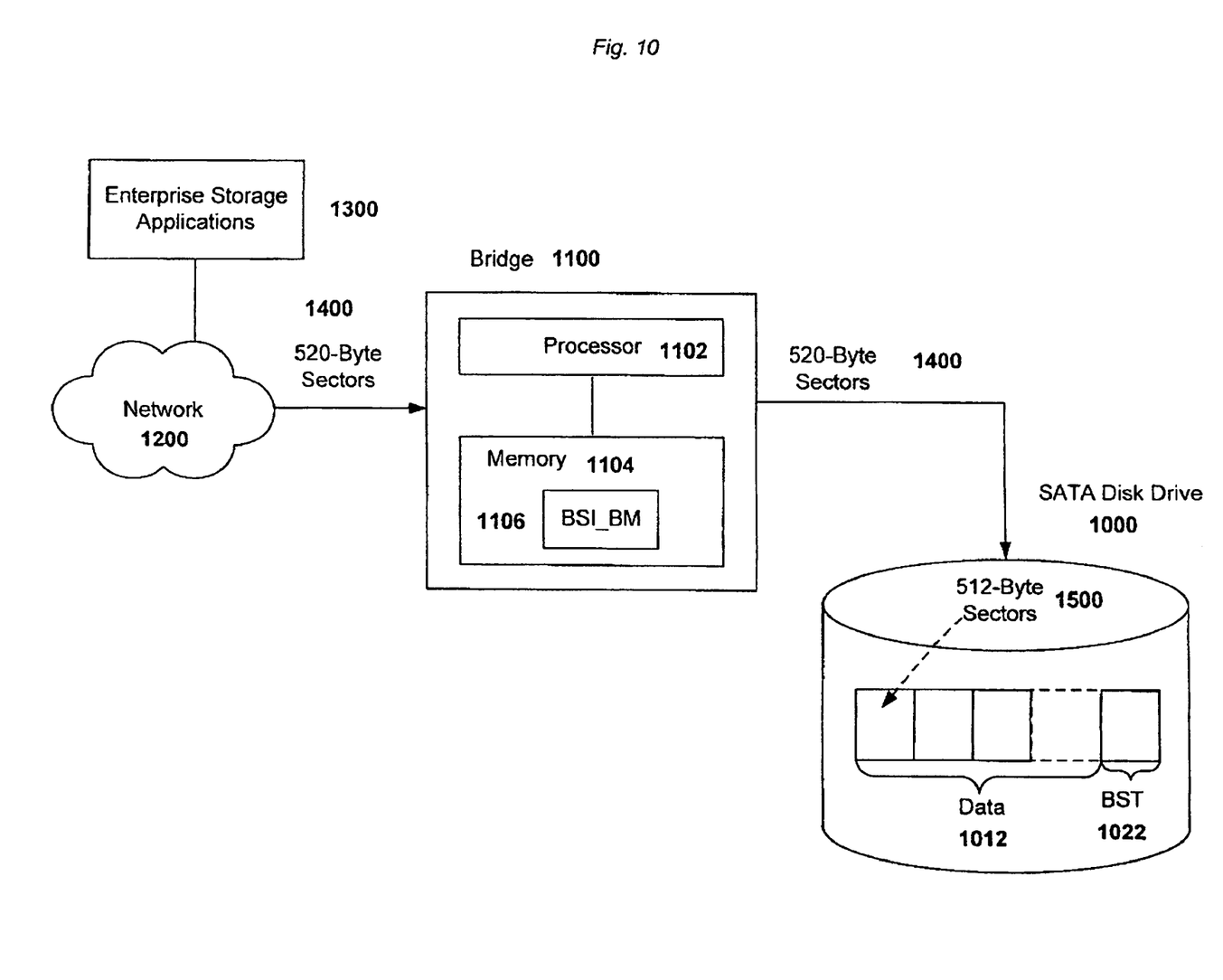
FIG. 10 is a block diagram showing an exemplary system configuration for protecting boundary sectors from corruption due to power failure during write operations in a sector remapping process according to various embodiments of the present invention.

FIG. 10 provides an exemplary system configuration in which boundary sectors can be protected from corruption due to power failure during write operations in a sector remapping process according to various embodiments of the present invention. As shown in FIG. 10, between an array of SATA disk drives, such as the SATA drive 1000, and various enterprise storage applications, such as the application 1300, a storage bridge 1100 is employed for translating or mapping logical sectors, such as 520-byte sectors 1400, into physical sectors in the drive, such as 512-byte sectors 1500. In one implementation, the bridge 1100 can be coupled to an individual SATA disk drive 1000 as a separate component in the system. Alternatively, the bridge 1100 is integrated into the individual disk drive 1000. The bridge 1100 is also configured to communicate with host servers (not shown) where the enterprise storage applications 1300 reside over a network 1200 that supports different transport protocols such as Fibre Channel (FC) protocols.

Typically, the storage bridge 1100 is a chip or circuit board, such as an ASIC (Application Specific Integrated Circuit), with a built-in processor (e.g., processor 1102) to execute pre-programmed software code stored in the memory space (e.g., memory 1104) of the bridge. The memory 1104 may comprise different types of memories configured for storing various data structures and software programs. For example, the memory 1104 can comprise a non-volatile memory (e.g., a flash) for storing the BST-BM 1106. The memory 1104 can also include a static RAM (not shown) for storing data received from the initiator and boundary sector data read from the drive.

The software code pre-programmed in the bridge 1100 includes programs or computer-readable instructions for performing various functionalities associated with writing logical sectors of data into the physical sectors of SATA drives. For instance, the bridge 1100 is configured with pre-coded programs and computer-readable instructions for executing the sector remapping process in FIGS. 8*a-b* and 9, including the steps of creating boundary sector entries in the BST and reading BSI_BM to determine how to recover corrupted data in the boundary sectors after power failure. The bridge 1100 is also configured with programs and computer-readable instructions to communicate with the SATA drive 1000, and more specifically, writing logical sectors of data into the non-reserved region of the disk and writing boundary sector entries into the BST in the reserved sectors of the disk.

In FIG. 10, the disk drive 1000 is illustrated as SATA disks, although it should be understood that the applicability of the present invention is not so limited. The present invention may be implemented with any other storage devices in need of sector remapping mechanisms. Usually the storage disks follow standard configurations and can be customized by different vendors to provide additional features or accommodate their customers' needs. For example, in order to accomplish the goal of protecting sector remapped boundary data as illustrated in FIGS. 4-9, the disk drive 1000 need to be modified to support the data structures and write operations described herein. In one implementation, the physical sectors in the disk drive 1000 are divided into non-reserved sector for storing data 1012 received from the initiator (e.g., enterprise storage applications 1300), and reserved sectors for storing a BST 1022 comprising numerous boundary sector entries. The disk drive 1000 is also configured to include software programs for communicating with the bridge 1100 to enable boundary data protection against catastrophic errors such as power failure while writing logical sectors of data into physical sectors of the drive.

In practice, the methods, processes or steps described herein may constitute one or more programs made up of machine-executable or computer-executable instructions. The above description, particularly with reference to the steps and flow charts in FIGS. 3, 8*a*, 8*b*, and 9, enables one skilled in the art to develop such programs, including such instructions to carry out the operations represented by logical blocks on suitably-configured processors. The machine-executable instructions may be written in a computer programming language or may be embodied in firmware logic or in hardware circuitry. If written in a programming language conforming to a recognized standard, such instructions can be executed on a variety of hardware platforms for interfacing with a variety of operating systems. The present invention is not described with reference to any particular programming language, but it will be appreciated that a variety of programming languages may be used to implement the teachings of the invention as described herein. Furthermore, it is common in the art to speak of software, in one form or another (e.g., program, procedure, process, application, module, logic), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein. In addition, one of ordinary skill in the art will recognize that the terms "computer-readable storage medium" or "machine readable medium" include memory space and any type of storage device accessible by a processor.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of protecting boundary sectors from corruption due to power failure in remapping and writing logical sectors into physical sectors in a storage device, said logical sectors different from said physical sectors at least in size, the method comprising:
   identifying a lower boundary sector and an upper boundary sector from said physical sectors during an unaligned write operation through which said logical sectors are remapped into said physical sectors in said storage device; and
   creating an entry in a boundary sector table stored in said storage device, said entry including said lower boundary sector and said upper boundary sector.

2. The method of claim 1, further comprising:
   receiving said logical sectors from an initiator; and
   determining said physical sectors in said storage device for storing said logical sectors.

3. The method of claim 2, further comprising:
   generating control information for said lower boundary sector and said upper boundary sector in accordance with information associated with said write operation; and
   including said control information into said entry.

4. The method of claim 3, further comprising:
   in response to creating said entry in said boundary sector table, setting a bit in a boundary sector information index to a first value, said index comprising multiple bits, each bit corresponding to a unique entry in said boundary sector table.

5. The method of claim 4, further comprising:
   detecting a power failure warning in said storage device; and
   responsive to detection of said power failure warning, having a copy of said index in a bridge coupled to said storage device.

6. The method of claim 5, further comprising:
   after power comes back up, reading said index to identify said bit having said first value;
   identifying from said boundary sector table said entry corresponding to said bit; and
   using said entry to restore data in said lower boundary sector and said upper boundary sector in accordance with said control information of said entry.

7. The method of claim 6, further comprising:
   generating a checksum value and including said checksum value in said control information of said entry; and
   checking said entry against said checksum value prior to using said entry to restore data in said lower boundary sector and said upper boundary sector.

8. The method of claim 7, further comprising:
   setting said bit to a second value after said data is restored in said boundary sectors.

9. The method of claim 1, further comprising:
   reading a write command from write command queued in said storage device to initiate said write operation; and
   writing said logical sectors in said physical sectors in said storage device.

10. The method of claim 1, further comprising:
    reserving a region in said storage device for storing said boundary sector table, said region comprising one or more physical sectors.

11. The method of claim 1, wherein said physical sectors include said lower boundary sector and said upper boundary sector.

12. The method of claim 1, wherein after said write operation, said physical sectors of said storage device contain data of said logical sectors and an unmodified data portion of said lower boundary sector.

13. The method of claim 1, wherein after said write operation, said physical sectors of said storage device contain data of said logical sectors and an unmodified data portion of said upper boundary sector.

14. The method of claim 1, wherein after said write operation, said physical sectors of said storage device contain data of said logical sectors, an unmodified data portion of said lower boundary sector, and an unmodified data portion of said upper boundary sector.

15. The method of claim 3, wherein said control information includes addresses of said lower boundary sector and said upper boundary sector in said storage device.

16. The method of claim 3, wherein said control information includes information indicating whether said lower boundary sector is aligned with said logical sectors, and information indicating whether said upper boundary sector is aligned with said logical sectors.

17. The method of claim 1, wherein said entry created in said boundary sector table contains two copies of data in said lower boundary sector and said upper boundary sector so that one copy can be used when the other copy is determined to be corrupted after checking a checksum value associated therewith.

18. A method of providing data integrity in mapping and writing logical sectors into physical sectors of a storage device, wherein said physical sectors include a lower boundary sector and an upper boundary sector, and said logical sectors and said physical sectors differ in size so that after said mapping and writing, at least a portion of said lower boundary sector or said upper boundary sector remains unmodified, said method comprising:
   detecting a warning of power failure in said storage device during said mapping and writing said logical sectors into said physical sectors, said power failure causing said unmodified portion to be corrupted; and
   storing a boundary sector information index in a bridge coupled to said storage device, said index containing multiple bits, each bit corresponding to a unique entry in a boundary sector table in said storage device, said bridge configured to recover said unmodified portion in accordance with said boundary sector table after the power comes back.

19. The method of claim 18, further comprising:
reading a bit from said index after the power comes back; and
determining whether said bit has a first value indicating its corresponding entry in said boundary sector table is valid.

20. The method of claim 19, further comprising:
if said bit is determined to have said first value, identifying said corresponding entry in said boundary table; and
using said entry to restore data in said lower boundary sector and said upper boundary sector before writing said logical sectors into said physical sectors, said data including sad unmodified portion.

21. The method of claim 20, further comprising:
checking said entry to ensure data integrity before using said entry to restore data in said lower boundary sector and said upper boundary sector.

22. The method of claim 20, further comprising:
in response to storing said data, setting said bit to a second value that indicates said entry is invalid.

23. The method of claim 18, further comprising:
determining said physical sectors from multiple physical sectors of said storage device for storing said logical sectors;
identifying said lower boundary sector and said upper boundary sector; and
creating said entry in said boundary sector table by including data of said lower boundary sector and said upper boundary sector.

24. The method of claim 23, further comprising:
generating control information for said lower boundary sector and said upper boundary sector in accordance with information associated with said mapping and writing logical sectors into said physical sectors; and
including said control information into said entry.

25. The method of claim 24, further comprising:
identifying addresses of said lower boundary sector and said upper boundary sector in said storage device according to said control information of said entry.

26. The method of claim 25, further comprising:
determining whether to restore data in said lower boundary sector according to said control information of said entry; and
determining whether to restore data in said upper boundary sector according to said control information of said entry.

27. The method of claim 26, further comprising:
verifying data in said lower boundary sector and said upper boundary sector according to said control information.

28. The method of claim 18, further comprising:
reserving one or more physical sectors in said storage device;
creating and storing said boundary sector table in said reserved one or more physical sectors, said boundary sector table having multiple entries, each entry having boundary sector data for a unique write command;
creating said entry by including data of said lower boundary sector and said upper boundary sector in said entry; and
inserting said entry in said boundary sector table.

29. The method of claim 18, further comprising:
reading a bit from said index after the power comes back;
determining whether said bit has a first value indicating its corresponding entry in said boundary sector table is valid;
if said bit is determined to have a second value indicating its corresponding entry in said boundary sector table is invalid, reading a next bit in said index.

30. The method of claim 18, wherein at least one entry in said boundary sector table contains one or more copies of data in said lower boundary sector and said upper boundary sector.

31. An apparatus configured for remapping and writing logical sectors into physical sectors in a storage device, said logical sectors different from said physical sectors at least in size, said apparatus comprising:
a processor; and
a memory accessible to said processor,
said processor configured to:
receive said logical sectors from an initiator;
determine said physical sectors in said storage device for an unaligned write operation through which said logical sectors are remapped into said physical sectors in said storage device;
identify a lower boundary sector and an upper boundary sector from said physical sectors; and
create an entry in a boundary sector table stored in said storage device, said entry including said lower boundary sector and said upper boundary sector.

32. The apparatus of claim 31, wherein said processor is further configured to:
in response to creating said entry in said boundary sector table, set a bit in a boundary sector information index to a first value, said index comprising multiple bits, each bit corresponding to a unique entry in said boundary sector table.

33. The apparatus of claim 32, wherein said index is stored in a non-volatile memory of said memory.

34. The apparatus of claim 32, wherein said processor is further configured to:
generate control information for said lower boundary sector and said upper boundary sector in accordance with information associated with said write operation; and
include said control information into said entry.

35. The apparatus of claim 34, wherein said control information includes addresses of said lower boundary sector and said upper boundary sector in said storage device.

36. The apparatus of claim 34, wherein said control information includes information indicating whether said lower boundary sector is aligned with said logical sectors, and information indicating whether said upper boundary sector is aligned with said logical sectors.

37. The apparatus of claim 34, wherein said control information includes information for checking data integrity of said entry.

38. The apparatus of claim 34, wherein said processor is further configured to:
detect a power failure warning in said storage device; and
responsive to detection of said power failure warning, store a copy of said index in said memory.

39. The apparatus of claim 38, wherein said processor is further configured to:
after power comes back up, read said index to identify said bit having said first value;
identify from said boundary sector table said entry corresponding to said bit; and
use said entry to restore data in said lower boundary sector and said upper boundary sector in accordance with said control information of said entry.

40. The apparatus of claim 39, wherein said processor is further configured to set said bit to a second value after said data is restored in said boundary sectors.

41. The apparatus of claim 31, wherein said processor is further configured to reserve a region in said storage device for storing said boundary sector table.

42. A storage bridge comprising said apparatus of claim 31.

43. An Application Specific Integrated Chip (ASIC) comprising said apparatus of claim 31.

44. The apparatus of claim 31, wherein said storage device is one of an array of storage devices.

45. A storage area network comprising said array of storage devices of claim 44.

46. The apparatus of claim 31, wherein said storage device is configured to integrate said apparatus therein.

47. A computer readable storage medium comprising computer-executable instructions protecting boundary sectors from corruption due to power failure in remapping and writing logical sectors into physical sectors in a storage device, said logical sectors different from said physical sectors at least in size, said instructions, when executed, causing a computer to:
   identify a lower boundary sector and an upper boundary sector from said physical sectors during an unaligned write operation through which said logical sectors are remapped into said physical sectors in said storage device; and
   create an entry in a boundary sector table stored in said storage device, said entry including said lower boundary sector and said upper boundary sector.

48. The computer readable storage medium of claim 47, comprising further computer-executable instructions, when executed, causing said computer to:
   in response to creating said entry in said boundary sector table, set a bit in a boundary sector information index to a first value, said index comprising multiple bits, each bit corresponding to a unique entry in said boundary sector table.

49. The computer readable storage medium of claim 48, comprising further computer-executable instructions, when executed, causing said computer to:
   read said index to identify said bit having said first value;
   identify from said boundary sector table said entry corresponding to said bit; and
   use said entry to restore data in said lower boundary sector and said upper boundary sector after said power failure according to control information in said entry.

50. The computer readable storage medium of claim 49, wherein said control information includes information indicating whether said lower boundary sector is aligned with said logical sectors, and information indicating whether said upper boundary sector is aligned with said logical sectors.

51. A computer readable storage medium comprising computer-executable instructions, said instructions, when executed, causing a computer to:
   detect a warning for power failure in a storage device during mapping and writing logical sectors into physical sectors of said storage device, wherein said physical sectors include a lower boundary sector and an upper boundary sector, and said logical sectors and said physical sectors differ in size so that after said mapping and writing, at least a portion of said lower boundary sector or said upper boundary sector remains unmodified, and said power failure can cause said unmodified portion to be corrupted;
   store a boundary sector information index in a bridge coupled to said storage device, said index containing multiple bits, each bit corresponding to a unique entry in a boundary sector table in said storage device; and
   recover said unmodified portion in accordance with said boundary sector table after the power comes back.

52. The computer readable storage medium of claim 51, comprising further computer-executable instructions, when executed, causing said computer to:
   read a bit from said index after the power comes back; and
   determine said bit to have a first value indicating its corresponding entry in said boundary sector table is valid;
   identify said corresponding entry in said boundary table;
   use said entry to restore data in said lower boundary sector and said upper boundary sector before writing said logical sectors into said physical sectors, said data including sad unmodified portion; and
   in response to storing said data, set said bit to a second value that indicates said entry is invalid.

\* \* \* \* \*